United States Patent [19]

Lynn

[11] 4,232,450
[45] Nov. 11, 1980

[54] FOOTBALL YARDLINE LOCATING DEVICE

[76] Inventor: William E. Lynn, 209-A Millbrook Rd., Raleigh, N.C. 27609

[21] Appl. No.: 960,554

[22] Filed: Nov. 14, 1978

[51] Int. Cl.³ .............................................. G01B 11/26
[52] U.S. Cl. .................................... 33/289; 33/137 L; 33/274
[58] Field of Search .................. 33/289, 432, 433, 434, 33/277, 1 CC, 276, 278, 280, 274, 227, 228, 286, 262, 137 L; 35/26, 34

[56] References Cited
U.S. PATENT DOCUMENTS

| 915,426 | 3/1909 | Gohring | 33/277 |
| 1,401,591 | 12/1921 | Doggett | 33/277 |
| 1,490,659 | 4/1924 | Carlozzi | 33/277 |
| 2,222,297 | 11/1940 | Mesjian | 33/277 |
| 2,539,560 | 1/1951 | Wilson | 33/289 |

Primary Examiner—William D. Martin, Jr.
Attorney, Agent, or Firm—Clarence A. O'Brien; Harvey B. Jacobson

[57] ABSTRACT

An object such as a football lying on a playing field is optically sighted through a measuring plane from a remote location. An adjustable framing assembly outlines the field as viewed in the measuring plane and mounts scale means to enable rapid measurement of the object location on the field.

9 Claims, 14 Drawing Figures

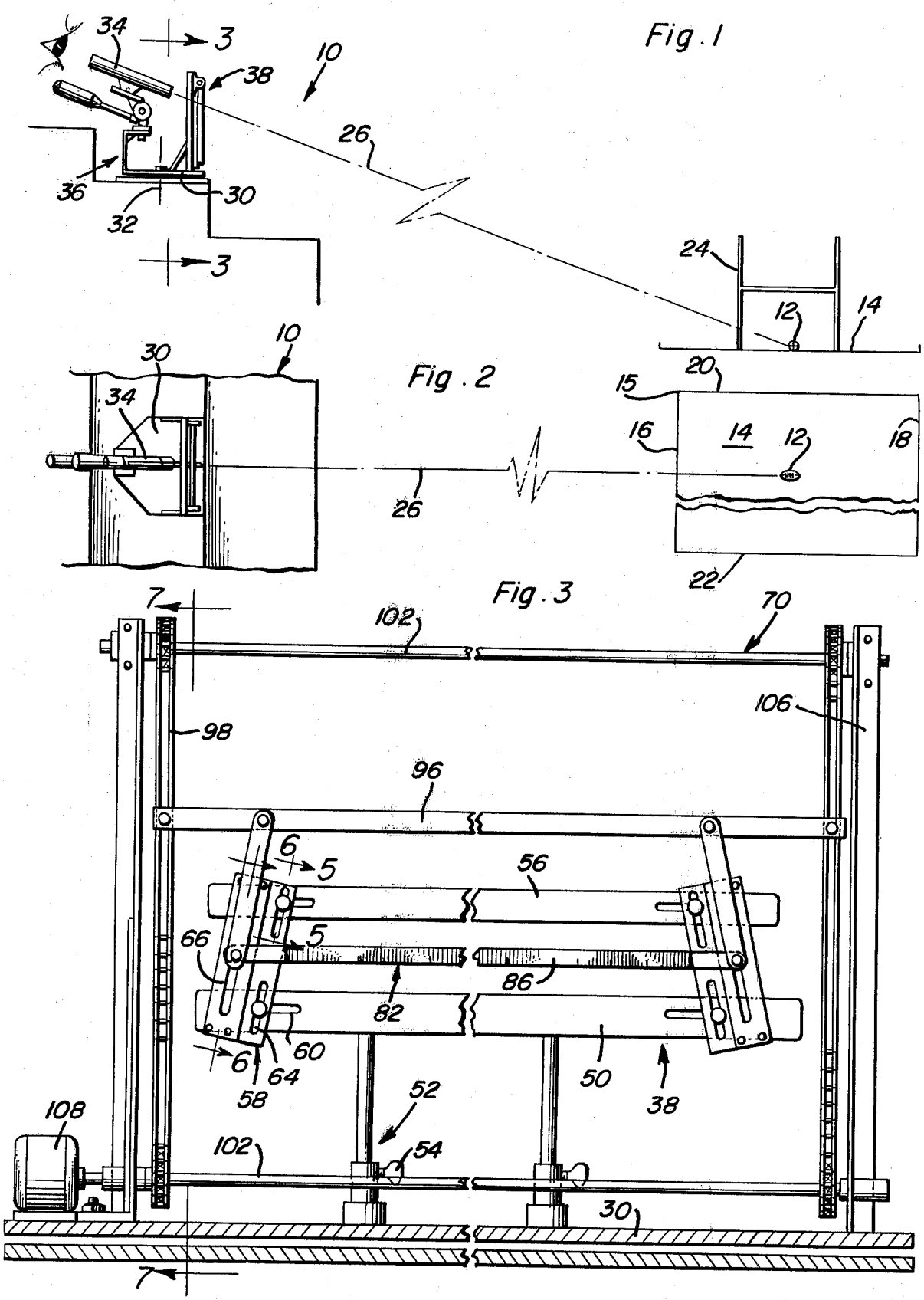

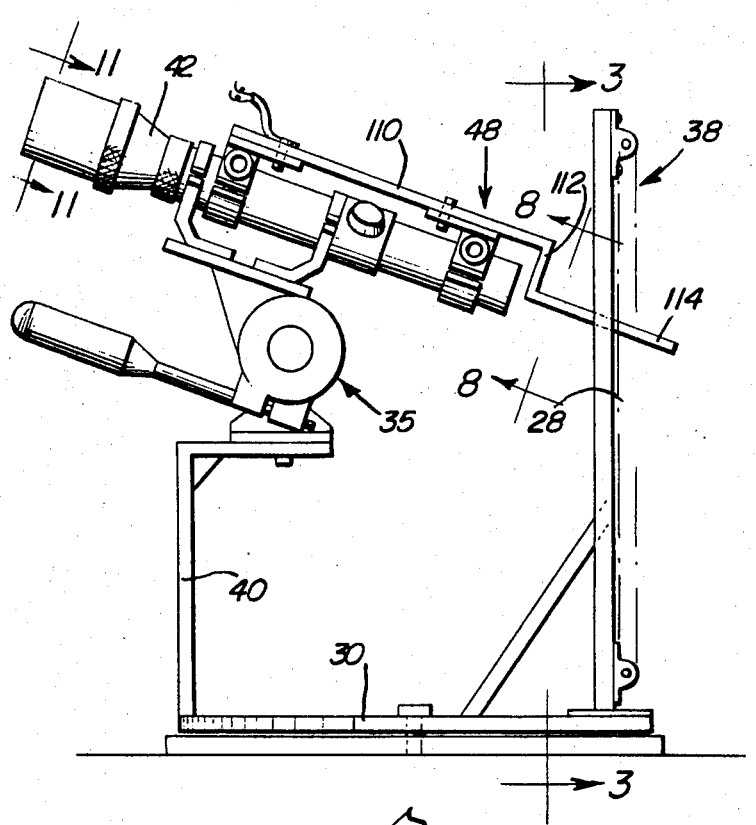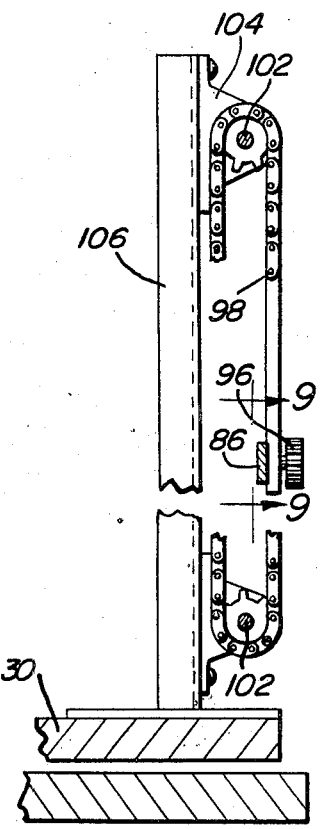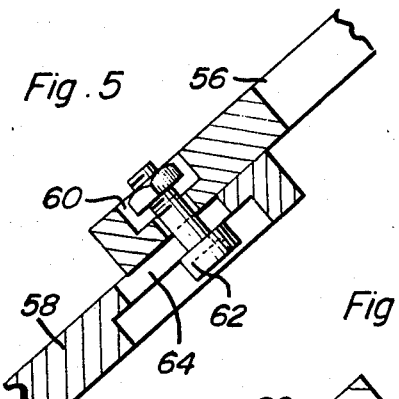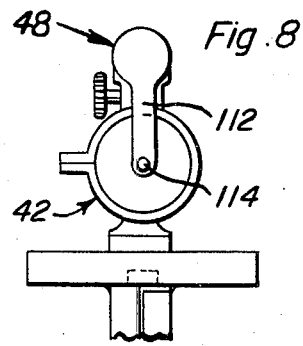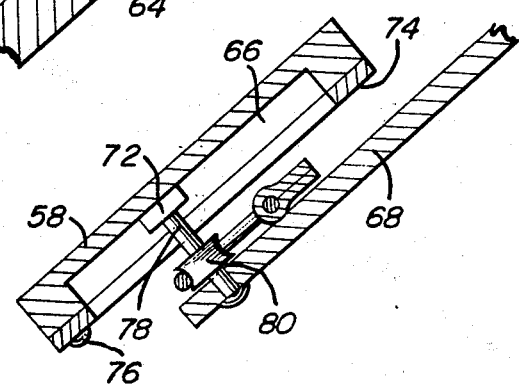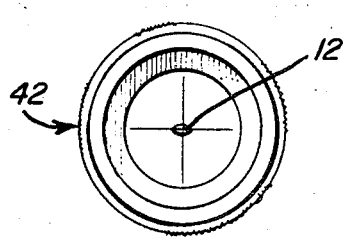

FOOTBALL YARDLINE LOCATING DEVICE

BACKGROUND OF THE INVENTION

This invention relates to apparatus for locating objects on a field from a remote location by optical sighting, and more particularly to determining the yardline position of a football on a playing field by optical measurement at a remote location.

In reporting the progress of a football game, media broadcast reporters must sometimes estimate the yardline position of the football when yardline markings are obscured because of snow, for example. The ability to accurately estimate yardline position of the football from the press box, remote from the playing field, substantially enhances live reporting of games and reduces misleading and annoyingly inaccurate reporting. Although football yardline locating apparatus are well known for determining close "first down" situations on the field, such apparatus are not suitable as an aid to live reporting of the game because of the slow measuring time involved and the remoteness of such apparatus from the reporter.

It is therefore an important object of the present invention to provide apparatus for accurately estimating the position of a football on a playing field by means of apparatus at a remote spectator location.

SUMMARY OF THE INVENTION

In accordance with the present invention, a framing assembly is mounted on a portable platform for adjustment in close spaced relation to an optical sighting assembly through which an object such as a football on a rectangular playing field is sighted. The framing assembly is adjusted to outline the perimeter of the playing field viewed as a trapezoidal polygon in a measuring plane intersected by the optical sighting axis. Once the framing assembly is adjusted, the football as viewed through a telescope replaceably mounted on the sighting assembly will appear as an object point within the trapezoidal polygon outlined in the measuring plane. Measuring scale means mounted on the framing assembly enables rapid location of the object point in the measuring plane corresponding to the yardline position of the football on the playing field.

The framing assembly establishes the trapezoidal outline of the field as viewed in the measuring plane by means of elongated framing elements interconnected at adjusted locations and adjusted angles. The scale means extends between these framing elements to present measuring increment markings in the measuring plane spaced in proportion to adjustment of the framing assembly so as to correspond to yardline measuring increments on the field for all adjusted positions of the framing assembly.

According to a preferred embodiment of the present invention, the measuring scale means is in the form of an elastic tape ruler, anchored at opposite ends by slides mounted on the side framing elements of the framing assembly. The elastic tape ruler is therefore of variable length with yardline markings along one edge. The tape ruler position is rapidly adjusted by means of an actuating mechanism so as to align its scale edge with the object point in the measuring plane. It should be appreciated that the function and attributes associated with the foregoing scale device of the elastic tape ruler type, could be achieved by other types of scale devices such as extensible rod types. The present invention also contemplates the use of other measuring scale means such as a scale grid made of thin wire mounted between the framing elements with the spacing of the grid wires adjusted in dependence on the adjustment of the framing assembly.

According to one embodiment of the invention, the framing elements aforementioned are rigid bars interconnected by releasably locked slide devices. In another embodiment, the framing elements are elastically extensible and pivotally anchored at the ends on a rigid frame secured to the platform. Another feature of the invention resides in a sighting aid attached to the telescope to mark the position of the sighted object in the measuring plane so that the scale device may be readily adjusted to a measuring position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a somewhat simplified side elevational view showing installation of the present invention.

FIG. 2 is a top plan view of the installation shown in FIG. 1.

FIG. 3 is an enlarged partial sectional view taken substantially through a plane indicated by section line 3—3 in FIG. 1.

FIG. 4 is a side sectional view taken substantially through a plane indicated by section line 4—4 in FIG. 3.

FIG. 5 is a sectional view taken substantially through a plane indicated by section line 5—5 in FIG 3.

FIG. 6 is a sectional view taken substantially through a plane indicated by section line 6—6 in FIG. 3.

FIG. 7 is a sectional view taken substantially through a plane indicated by section line 7—7 in FIG. 3.

FIG. 8 is a sectional view taken substantially through a plane indicated by section line 8—8 in FIG. 4.

FIG. 11 is a sectional view taken substantially through a plane indicated by section line 11—11 in FIG. 4.

DETAILED DESCRIPTION OF PREFERRED EMBODIMENTS

Figure 9:
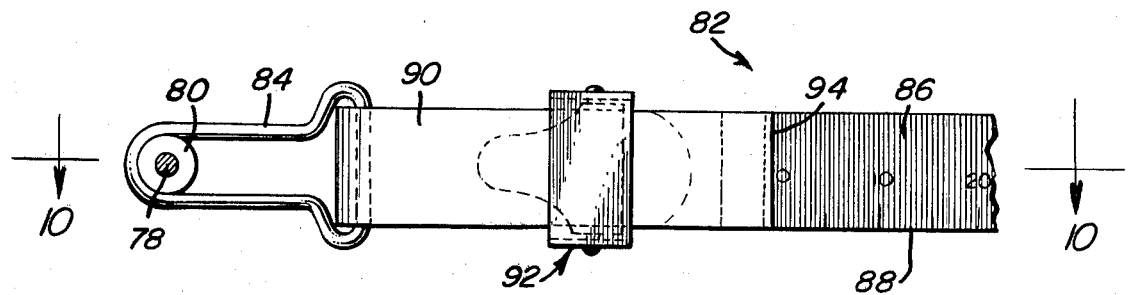
FIG. 9 is an enlarged partial sectional view taken substantially through a plane indicated by section line 9—9 in FIG. 7.
Figure 10:
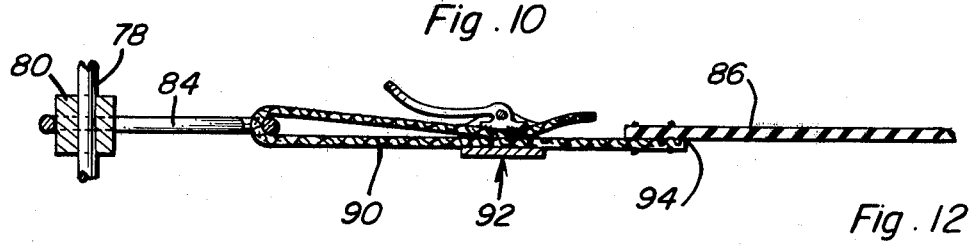
FIG. 10 is a sectional view taken substantially through a plane indicated by section line 10—10 in FIG. 9.

Referring now to the drawings in detail, FIGS. 1 and 2 illustrate a typical installation for the locator device of the present invention generally referred to by reference numeral 10. By means of device 10, a spectator of a football game may optically sight a football or similar object 12 on a horizontal playing field or surface 14, the perimeter of which is clearly defined by end zone markers 15 at the corners, parallel side lines 16 and 18 of 50 yards length and parallel end zone lines 20 and 22 at which goal posts 24 are located. The football 12 is sighted along an optical axis 26 from a remote location elevated above the field as shown in FIG. 1. The optical axis intersects a measuring plane 28 established by the device 10 substantially perpendicular to the playing field. In order to align the device 10 with the field 14, it is mounted on a platform 30 adjustable about a vertical axis 32. The football 12 will be viewed as a point in the measuring plane 28 while the rectangular field 14 will be viewed as a 4-sided polygon of which the sides and angles are unequal by amounts depending on the location of the device 10 relative to the field. The field 14 may be viewed through a sighting tube 34 as shown in FIGS. 1 and 2.

According to one embodiment of the invention as depicted in FIGS. 3 and 4, the platform 30 mounts in fixed spaced relation to each other, an optical sighting assembly 36 and an adjustable framing assembly 38. The sighting tube 34 shown in FIGS. 1 and 2 is mounted by the optical sighting assembly 36 aligned with the optical axis 26. A mounting post 40 secured to the platform 30 supports a conventional type of adjustable camera mount 35 to alternatively mount the tube 34 and a telescope 42, as shown in FIG. 4. Mounted on the forward end portion and on top of the telescope 42 is a sighting aid generally referred to by reference numeral 48 to be described in detail hereinafter. The forward end of the telescope is closely spaced from the measuring plane 28 established by the framing assembly 38.

Figure 12:
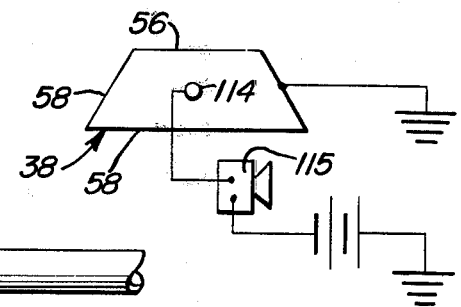
FIG. 12 is an electrical circuit diagram showing an alarm indicator device associated with the invention.

The framing assembly 38 as more clearly seen in FIG. 3, includes a lower horizontal framing element 50 in the form of an elongated rigid bar that is adjustable in height above the platform 30. The rigid framing bar 50 is therefore supported by a pair of spaced telescoping post assemblies 52 adapted to be locked in adjusted position by set screws 54. An upper rigid framing bar 56 is interconnected with the lower framing bar 50 in coplanar relation thereto by a pair of side framing members 58. The lower and upper horizontal bars 50 and 56 are provided with slots 60 adjacent opposite longitudinal ends thereof through which the side frame members 58 are interconnected with the bars 50 and 56 at an adjusted position and angle by means of fasteners 62 extending through slots 64 in the members 58. The interconnected framing members 50, 56 and 58 thus form the framing assembly which is generally aligned with the measuring plane 28 aforementioned. By means of the fasteners 62, the framing assembly may be locked in any position position to which it is manually adjusted upon loosening of the fasteners. Thus, the four framing members 50, 56 and 58 may be adjusted to enclose a trapezoidal polygon corresponding to the field 14 as it is viewed through the sighting tube 34 as shown in FIG. 12.

Each of the side framing members 58 is formed with an elongated track slot 66 through which it is interconnected with a link 68 forming part of a scale actuating mechanism 70. As more clearly seen in FIG. 6, each slot 66 receives a roller 72 held therein by a retainer plate 74 secured in place to the side framing member 58 by fasteners 76. A roller shaft 78 extends from the roller 72 and is connected to the lower end of the link 68. A spacer 80 is mounted on each roller shaft between the link 68 and side frame member 58 in order to anchor a scale device generally referred to by reference numeral 82.

In order to make the yardline measurements in the measuring plane, the spacers 80 on the side framing members 58 slidably mount anchors 84 for the opposite longitudinal ends of the scale device 82 as more clearly seen in FIG. 9. The scale device includes an elastically deformable tape 86 made of an elastomeric material and having scale indicia formed thereon at its lower edge 88, such as yardline markings. The elastic tape 86 is held under tension by the anchors 84 to which it is connected by non-stretchable flexible fabric section 90. The lengths of the sections 90 are adjustable by means of friction locking buckle devices 92 of any well known type in order to align the ends 94 of the elastic tape with the intersections between the inner edges of the framing members 56 and 58.

Vertical displacement of the scale device 82 is effected by the actuating mechanism 70 to cause a uniform variation in the scale length of the tape 86 as the scale anchors 84 are slid along the side framing members 58 that have been adjusted to non-parallel positions in order to frame or outline the playing field as viewed in the measuring plane 28. The displacement of the scale edge 88 is confined to the measuring plane because of the slidable mounting of the anchors 84 on the side framing members 58 in close parallel spaced relation to the measuring plane.

According to one embodiment of the invention, the actuating mechanism includes a displacing bar 96 pivotally connected to the diverging links 68 and maintained in a position parallel to the framing bars 50 and 56 as shown in FIG. 3. The ends of the bar 96 are connected to a pair of endless sprocket chains 98 as shown in FIGS. 3 and 8. The sprocket chains are entrained about sprocket wheels fixed to upper and lower shafts 100 and 102 mounted in parallel spaced relation above the platform 30 by bearings 104 fixed to vertical frame posts 106 secured to the platform. A drive motor 108 connected to the lower shaft and having suitable controls associated herewith is energized to order to effect vertical movement of the displacing bar 96 for displacement of the scale device 82 between a retracted position above the upper framing bar 56 and a measuring position.

Adjustment of the framing assembly 38 is effected while viewing the field through the sighting tube 34 without the aid of lenses. The end zone markers 15 are relied upon to locate the crossing points for the inside edges of the framing members. Once adjusted, the sighting tube 34 is replaced on the post 40 by the telescope 42 utilized to sight the football 12 by adjustments about vertical and horizontal axes without disturbing adjustment of the framing assembly 38.

Since the tape 86 in the measuring position will obscure most of the view when sighting the football through the telescope 42, the object point as viewed through the telescope is located in the measuring plane by the sighting aid 48 aforementioned before the scale device is lowered to the measuring position. The sighting aid 48 includes a support rod 110 fixed to the top of the telescope as shown in FIG. 4 and extending forwardly therefrom. An arm 112 depends from the forward end of rod 110 to support a marker pin 114 projecting therefrom along the optical axis through the measuring plane. Viewing of the football through the telescope is not obscured by the described sighting aid 48 which is operative through the pin 114 to mark the sighted object 12 in the measuring plane. The scale device may then be lowered until edge 88 abuts the marker pin when it reaches the measuring position.

As shown in FIG. 12, the marker pin 114 is connected in circuit with an audible indicator device 115 while the framing assembly 38 is grounded. Accordingly, movement of the marker pin during adjustment of the telescope 42 will be limited by contact with the framing elements 50, 56 or 58. The telescope is, of course, adjusted to sight onto the football. Thus, when the football moves beyond the playing field 14 outside of either the end zone lines 16 or side lines 20 and 22, the marker pin will contact the framing assembly to complete an energizing circuit through device 115 signifying either a "touchdown" or an "outside" situation.

Figure 13:
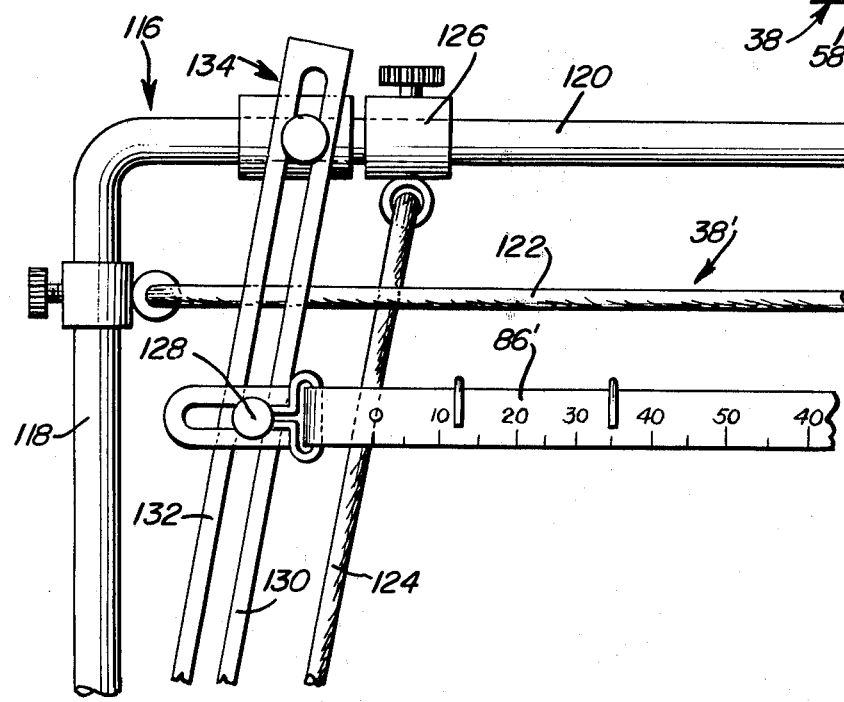
FIG. 13 is a partial side elevational view showing a modified form of framing assembly.
Figure 14:
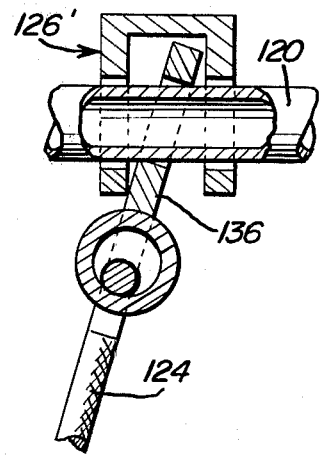
FIG. 14 is a partial sectional view showing a modification to FIG. 13.

FIG. 13 illustrates a modified form of the framing assembly generally referred to by reference numeral 38' mounted on an adjustable platform as hereinbefore described which also mounts a rigid outer frame 116 having vertical side portions 118 and horizontal portions 120 supporting the framing assembly 38'. The framing assembly is of the flexibly elastic type on which the horizontal framing elements 122 and the side framing elements 124 are made of elastically extensible material rather than rigid bars as in the case of framing assembly 38. The framing elements are anchored at their longitudinal ends on the rigid frame 116 by slidable locking collars 126. By means of the locking anchor collars 126, the framing elements are adjusted to positions outlining the playing field as viewed in the measuring plane in which the scale device 82' lies. The scale element is anchored at its ends by slides 128 received in guide slots 130 of a pair of adjustable side bars 132. The side bars are adjusted parallel to the side framing elements 124 by means of slide connectors 134 mounted on the horizontal frame portions 120.

FIG. 4 illustrates another type of self-locking anchor 126' for the ends of the framing elements. A one-way friction locking element 136 engages the frame portion 120 since the framing elements 124 are necessarily in non-parallel positions as shown.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for locating a point on a remote surface having a perimeter, comprising a substantially stationary platform, optical sighting means mounted by the platform for viewing said said point on the remote surface through a measuring plane, framing means mounted on the platform for adjustment to an outline corresponding to said remote surface perimeter viewed substantially in said measuring plane, extensible scale means movably mounted by the framing means for displacement substantially in said measuring plane, and actuating means connected to the scale means for displacement thereof to a measuring position indicating the location of said point on the remote surface relative to said perimeter as outlined in the measuring plane.

2. The combination of claim 1 wherein said scale means includes an elastic element having a scale thereon, anchor means movably mounted on the framing means for guided movement along the outline in the measuring plane corresponding to said perimeter, and adjustable non-elastic means for interconnecting the anchor means with opposite ends of the elastic element.

3. The combination of claim 2 wherein said framing means includes a plurality of framing elements, means adjustably interconnecting the framing elements to form said outline in the measuring plane, said anchor means being connected to at least two of said framing elements.

4. The combination of claim 2 or 3 wherein said actuating means includes a rigid bar and link means connecting said bar to the anchor means for simultaneous displacement of the opposite ends of the elastic element.

5. The combination of claim 3 wherein said framing elements are rigid members.

6. The combination of claim 3 wherein said framing elements are elastically extensible members.

7. The combination of claim 1 wherein said corresponding outline defines a trapezoidal polygon having opposite sides along which the scale means is anchored.

8. Apparatus for measuring the location of an object on a remote surface enclosed by a predetermined perimeter, including means for sighting said object along an optical axis, means for establishing a measuring plane intersected by said optical axis, adjustable framing means for outlining said predetermined perimeter as viewed in said measuring plane, an elastically deformable scale element, anchor means mounted on the framing means and connected to the scale element for guiding movement thereof substantially within said measuring plane, and displacing means engageable with the anchor means for movement of the scale element along an adjusted path within the measuring plane to a measuring position aligned with said optical axis.

9. Apparatus for measuring the location of an object on a remote surface enclosed by a predetermined perimeter, including means for sighting said object along an optical axis, means for establishing a measuring plane intersected by said optical axis, adjustable framing means for outlining said predetermined perimeter as viewed in said measuring plane, scale means of uniformly variable length for measuring distances in the measuring plane, and means for guiding movement of the scale means on the framing means to a measuring position intersecting the optical axis.

* * * * *